US008757977B2

(12) United States Patent
Swift et al.

(10) Patent No.: US 8,757,977 B2
(45) Date of Patent: Jun. 24, 2014

(54) BACK-UP FEATHERER

(75) Inventors: Andrew Swift, Uttoxeter (GB); Antony Morgan, Wolverhampton (GB); Paul Simms, Hathern (GB)

(73) Assignee: Rolls-Royce PLC, London (GB)

( * ) Notice: Subject to any disclaimer, the term of this patent is extended or adjusted under 35 U.S.C. 154(b) by 607 days.

(21) Appl. No.: 13/086,795

(22) Filed: Apr. 14, 2011

(65) Prior Publication Data

US 2011/0274546 A1 Nov. 10, 2011

(30) Foreign Application Priority Data

May 6, 2010 (GB) .................................. 1007564.6

(51) Int. Cl.
*B64C 11/42* (2006.01)

(52) U.S. Cl.
USPC ....................................................... 416/168 A

(58) Field of Classification Search
CPC ...... B64C 11/38; B64C 11/385; B64C 11/40; B64C 11/42
USPC .......... 416/147, 155, 156, 158, 157 R, 157 A, 416/157 B, 159, 160, 164, 167, 168 R, 168 A
See application file for complete search history.

(56) References Cited

U.S. PATENT DOCUMENTS

| | | | |
|---|---|---|---|
| 2,850,106 A * | 9/1958 | Aldon | ................................ 416/2 |
| 2,924,281 A | 2/1960 | Mergen et al. | |
| 2,980,188 A | 4/1961 | Allen et al. | |
| 3,004,608 A | 10/1961 | Pond | |
| 4,878,809 A | 11/1989 | Ames | |
| 5,042,966 A | 8/1991 | Schwartz et al. | |
| 5,152,668 A | 10/1992 | Bulman et al. | |
| 5,174,718 A | 12/1992 | Lampeter et al. | |
| 5,186,608 A | 2/1993 | Bagge | |
| 5,213,471 A | 5/1993 | Miller et al. | |
| 5,242,265 A | 9/1993 | Hora et al. | |

(Continued)

FOREIGN PATENT DOCUMENTS

| | | |
|---|---|---|
| EP | 1 881 176 A2 | 1/2008 |
| EP | 2 189 646 A2 | 5/2010 |

(Continued)

OTHER PUBLICATIONS

Great Britain Search Report issued in Application No. GB 1007564.6, dated Aug. 5, 2010.

(Continued)

*Primary Examiner* — Richard Edgar
(74) *Attorney, Agent, or Firm* — Oliff PLC

(57) ABSTRACT

A back-up featherer is provided for an engine arrangement having a main hydraulic actuator which operates a pitch change mechanism to angularly displace propellers of a propeller assembly of the engine arrangement, the pitch change mechanism and main hydraulic actuator rotating with the propeller assembly. The back-up featherer has one or more back-up hydraulic actuators located on a static structure of the engine arrangement. The back-up featherer further has one or more load application members which are located on the static structure of the engine arrangement and which are movable by the back-up hydraulic actuators. When moved by the back-up hydraulic actuators, the load application members bear against an engagement portion of the pitch change mechanism across a rotating interface formed therebetween to apply a load to the pitch change mechanism which results in angular displacement of the propellers.

9 Claims, 3 Drawing Sheets

(56) References Cited

U.S. PATENT DOCUMENTS

| | | | |
|---|---|---|---|
| 5,281,094 | A | 1/1994 | McCarty et al. |
| 5,282,719 | A | 2/1994 | McCarty et al. |
| 6,059,528 | A | 5/2000 | Danielson et al. |
| 2011/0164978 | A1 | 7/2011 | Swift et al. |

FOREIGN PATENT DOCUMENTS

| | | |
|---|---|---|
| GB | 1 041 353 | 1/1962 |
| GB | 1 384 383 | 8/1971 |
| GB | 1 375 988 | 12/1971 |
| GB | 2 071 781 A | 3/1981 |
| GB | 2 236 810 A | 4/1991 |
| GB | 2 260 821 A | 4/1993 |
| GB | 2 347 974 A | 9/2000 |
| WO | WO 91/09774 | 7/1991 |
| WO | WO 91/09775 | 7/1991 |
| WO | WO 98/22340 | 5/1998 |
| WO | WO 99/20522 | 4/1999 |

OTHER PUBLICATIONS

Great Britain Search Report issued in Application No. GB 1007569.5, dated Aug. 31, 2010.
Great Britain Search Report issued in Application No. GB 0002681.5, dated Jul. 14, 2000.
Great Britain Search Report issued in Application No. GB 1007567.9, dated Aug. 19, 2010.
U.S. Appl. No. 13/086,880, filed Apr. 14, 2011, by Andrew Swift, et al.
U.S. Appl. No. 13/086,866, filed Apr. 14, 2011, by Antony Morgan.
U.S. Appl. No. 13/086,876, filed Apr. 14, 2011, by Antony Morgan.
Feb. 10, 2014 Notice of Allowance issued in U.S. Appl. No. 13/086,876.
Mar. 3, 2014 Notice of Allowance issued in U.S. Appl. No. 13/086,880.
Feb. 7, 2014 Notice of Allowance issued in U.S. Appl. No. 13/086,866.

\* cited by examiner

BACK-UP FEATHERER

The present invention relates to a back-up featherer for an engine arrangement having a main hydraulic actuator which operates a pitch change mechanism to angularly displace propellers of a propeller assembly of the engine arrangement.

Aero propellers, either single rotor or contra-rotating, usually have a means of varying the blade pitch via a pitch control mechanism (PCM), to optimise efficiency of thrust delivery and to reduce noise throughout the flight envelope, to provide reverse thrust, and to be able to feather the blades to control drag and rotor speed in some powerplant failure cases. There are a number of established ways of configuring a PCM, but all feature a source of power, prime mover, mechanism from prime mover to blade, and a failsafe system. The power source can be in the static or rotating field, although it is more common for it to be in the static field to avoid static to rotating control communication issues and for easier line replacement of faulty components. However, where the power source is in the static field, a means of transferring the power to the rotating field(s) is required.

For a static electrical power source the transfer is typically achieved via slip rings. These are used on single propeller assembly turboprop engines. However, they suffer from a high maintenance burden. Further, on an engine having two contra-rotating propeller assemblies, and particularly such an engine where the exhaust is ducted under the propeller blade roots, the slip rings would experience very high operating speeds which would significantly reduce slip ring life. The high speeds result from a need to locate the rings at large radial distances in a non-oily zone, as well as from the high relative speeds caused by contra-rotation. Thus slip rings are not seen as a viable solution for power source transfer in contra-rotating propeller assemblies.

For a static hydraulic power source, the transfer can be achieved by rotating hydraulic couplings. For example, in a single rotor engine arrangement, the propeller assembly may be driven by a hollow propeller shaft. A rotating hydraulic coupling can be provided at one end of the propeller shaft, with hydraulic supply lines running inside the shaft from the coupling to a PCM prime mover (e.g. a hydraulic actuator) adjacent the propeller blades. The propeller shaft, supply lines and prime mover are all in the rotating field. A hydraulic pressure power source, which is in the static field, supplies hydraulic fluid to the coupling, and thence to the supply lines.

However, a fundamental design constraint on a rotating hydraulic coupling is that the product (PV) of static to rotating interface velocity (V) and hydraulic pressure (P) should be kept within limits to maintain seal life, assuming positive sealing is necessary. Since propeller rotational speed is generally predetermined, reducing the diameter of the rotating interface is thus of prime importance. Even in circumstances where some leakage is permissible from the rotating hydraulic coupling, reducing the rotating interface diameter helps to decrease the amount of that leakage.

Turboprop engines, whether having a single propeller assembly or two contra-rotating propeller assemblies, employ a reduction gearbox. As shown schematically in FIG. 1, such a gearbox 1 can be of a step-aside shaft configuration in which a drive shaft 2 extending from the free power turbine 3 of the engine 4 is laterally offset from the propeller shaft 5 of the propeller assembly 6. In this configuration, a small diameter, and hence low PV value and low leakage hydraulic coupling 7 may be located at the rear of the gearbox on the end of the propeller shaft, which is hollow. As described above, supply lines 8 can run along the inside of the propeller shaft to supply a hydraulic actuator 9, which rotates with the propeller assembly, with hydraulic fluid from a static hydraulic pressure power source 10.

Alternatively, as shown schematically in FIG. 2, the gearbox 1 can be of a coaxial epicyclic configuration, in which typically a sun gear of the gearbox is driven by and coaxial with the drive shaft 2 extending from the free power turbine 3 of the engine 4. However, as the axis of the propeller, gearbox and gas generator are coincident, it is more problematic to arrange for a small diameter hydraulic coupling 7 with an acceptably low PV value and low leakage rate because the static part of the coupling is outside the propeller shaft 5 outer diameter.

In the event of PCM failure, it may be desirable to move the blades to coarse to prevent dangerous increases in engine speed. In the event of engine failure, it may likewise be desirable to move the blades to coarse to reduce aircraft gliding resistance. However, the combined effect of rotational and aerodynamic forces acting on the blades tends to urge the blades to fine. Thus PCMs usually have a failsafe arrangement for preventing undesirable pitch variation in the event of power failure.

FIG. 3 shows schematically a longitudinal cross-section through a prior art PCM for varying the pitch of a row of propeller blades of a propeller assembly. The PCM comprises a hydraulic cylinder 11 and piston 12 which extend along the rotational axis X of the propeller blades 13 (only one of the propeller blades being shown in FIG. 3). The cylinder contains hydraulic fluid (e.g. oil), and a wall 14 fluidly seals the end of the cylinder. The piston divides the cylinder into two chambers 15, 16. By varying the fluid pressure difference between the two chambers, the piston can be moved to the left or the right along the axis X.

A quill 17 extends radially inwardly from the inboard end of each propeller blade 13 along the rotational axis Y of the blade, the quill connecting to an end of a crank arm 18 which has its other end in a respective retaining recess 19 formed at the end of the piston 12. By this mechanism, movement of the piston along the rotational axis X is converted into pitch-changing rotation of the blade about rotational axis Y.

The cylinder 11 is part of a larger housing which also provides a fixing arrangement 20 for the propeller blades 13 and a rotation drive input 21 for turning the propeller assembly. The drive input is typically connected to the output shaft of an engine gearbox. Hydraulic fluid for the chambers 15, 16 is provided by a fluid transmission tube 22 which extends axially from the drive input. A rotating fluid coupling 23 at the end of the tube allows fluid to be transmitted between the static and rotating fields.

A ball screw 24 (i.e. a screw with a plurality of balls located in the thread of the screw) extends along the rotational axis X, an end of the ball screw 24 being fixed by a hydraulically signaled brake 25 to the wall of the cylinder 11. A nut 26 which is axially and rotationally fixed relative to the piston 12 is threadingly engaged to balls of the ball screw. Lubricated in the hydraulic fluid, the balls provide a low friction threaded connection between the screw and the nut and offer little resistance to the axial movement of the piston in the cylinder whilst the pressurised de-activated brake allows the screw to rotate. However, in the event of fluid pressure loss, the brake activates and increases the frictional resistance to rotational movement of the screw, which restrains movement of the nut and piston and thereby prevents changes to the pitch of the propeller blades 13 in the fine direction.

PCMs, such as the one shown in FIG. 3, require the propeller assembly to have a central zone along its rotational axis for installation of the apparatus. Generally, such a zone is available on single propeller engines where the propeller assembly is mounted to one side of the engine's drive gearbox. However, other engine arrangements, and particularly in-line arrangements, may not have this zone available. For example, EP A 1881176 describes a contra-rotating propeller engine with a pair of propeller blade assemblies which rotate in opposite directions as a result of association with a coaxial epicyclic gear assembly acting as a differential gearbox, The propeller assemblies are in the "pusher" configuration, with the free power turbine drive shaft, static support structure for the propeller assembly rotors and the gearbox occupying central space on the axis of the forward propeller assembly, and thereby rendering a centrally-located ball screw style pitch lock apparatus impractical for at least the forward propeller assembly. Likewise, a centrally-located ball screw style pitch lock system would be impractical for the rear propeller assembly of a propeller engine with a pair of contra-rotating "puller" propeller blade assemblies driven by an in-line gear assembly.

The pitch of the propeller blades 13 is actively controlled by pitch control valves 27 which change the pressures in "to fine" fluid supply line 28 and "to coarse" fluid supply line 29 to vary the pressure within the chambers 15, 16 and thereby to cause pitch angle rotation. The pitch control valves 27 are supplied with hydraulic fluid by engine and gearbox mounted hardware such as a pump 30.

Fluid pressure loss within the chambers, which restrains movement of the nut 26 and piston 12 and thereby prevents changes to the pitch of the propeller blades 13 in the fine direction, follows from de-pressurisation of "pitch lock" line 31. This de-pressurisation may be due to system command to a special pitch lock control valve or through general loss of hydraulic system pressure.

The system also includes a separate back-up feather pump 32 which feeds hydraulic pressure into the primary system "to coarse" fluid supply line 29, thereby increasing blade angle which will reduce rotor speed and can reduce propeller drag at low angles.

The PCM is thus supported by two safety systems:
A pitch lock which holds the blade angle when completely de-energised, so that the rotor speeds and drags can be stabilised until the aircraft air speed, engine power or altitude changes.
A back-up feather system which allows the blade angle to be increased by means of a secondary source of hydraulic pressure, as long as the hydraulic integrity of the "to coarse" primary line from the control valves 27 through to the appropriate one of the chambers 15, 16 is intact.

This primary line typically includes: static external pipes, a rotating coupling, rotating pipes, an actuator cylinder, various static seals and piston head dynamic seals. Whilst high reliability of the line can be expected, a zero failure rate is difficult to achieve. Further, for contra-rotating propeller systems, the "to coarse" primary line may be subject to a more complex route through the contra-rotating drive system, which potentially introduces more failure mode threats than single propeller systems which can make use of an offset gearbox.

Thus an object of the present invention is to provide a back-up featherer which is less reliant on a "to coarse" primary line.

Accordingly, a first aspect of the present invention provides a back-up featherer for an engine arrangement having a main hydraulic actuator which operates a pitch change mechanism to angularly displace propellers of a propeller assembly of the engine arrangement, the pitch change mechanism and main hydraulic actuator rotating with the propeller assembly, wherein the back-up featherer has:
one or more back-up hydraulic actuators located on a static structure of the engine arrangement, and
one or more load application members which are located on the static structure of the engine arrangement and which are movable by the back-up hydraulic actuators;
wherein, when moved by the back-up hydraulic actuators, the load application members bear against an engagement portion of the pitch change mechanism across a rotating interface formed therebetween to apply a load to the pitch change mechanism which results in angular displacement of the propellers.

Thus, advantageously, the back-up featherer does not have to rely on a "to coarse" primary line, i.e. it can be an independent feathering system, having sufficient physical separation from the primary system to ensure no common mode failures between the primary and back-up feathering systems.

The back-up featherer may have any one, or to the extent that they are compatible, any combination of the following optional features.

Typically the back-up featherer further has one or more back-up fluid supply lines for transferring hydraulic fluid between a hydraulic pressure power source located on the static structure of the engine arrangement and the back-up hydraulic actuators.

Typically the back-up featherer further has a plurality of circumferentially spaced load application members. This increases redundancy and helps to produce a more circumferentially uniform applied load on the pitch change mechanism.

The back-up featherer may further have a rotating bearing, e.g. comprising ball or needle bearings, at the rotating interface between the load application members and the engagement portion. The rotating bearing allows load to be transferred between the load application members and the engagement portion while avoiding producing significant resistance to the relative rotation of the propeller assembly and the static structure of the engine arrangement. The rotating bearing can be mounted to the engagement portion so that the load application members are brought into contact with the bearing when the load application members bear against an engagement portion. Alternatively, the rotating bearing can comprises respective rotating bearing elements mounted to the load application members so that the engagement portion is brought into contact with the bearing elements when the load application members bear against an engagement portion.

Preferably, the back-up hydraulic actuators have a dormant state in which the load application members are spaced from the engagement portion. In this way, the relative rotation of the propeller assembly and the static structure of the engine arrangement can be completely unhindered by the back-up featherer under normal operating conditions.

Typically, the pitch change mechanism has a unison ring which is coaxial with the propeller assembly, the unison ring being movable by the main hydraulic actuator and by the back-up hydraulic actuators to operate drive systems for angular displacement of respective propellers. Advantageously, the unison ring can be installed coaxially to the propeller assembly, but not in the central zone along its rotational axis. Thus the back-up featherer (and indeed the main hydraulic actuator) can be used to control the pitch of the forward propeller assembly of a propeller engine with a pair of contra-rotating "pusher" propeller blade assemblies driven by an in-line gear assembly, or the rear propeller assembly of a propeller engine with a pair of contra-rotating "puller"

propeller blade assemblies driven by an in-line gear assembly. Each drive system operated on by the unison ring can conveniently comprise a lever arm or cam follower at the end of a quill shaft extending from the base of the respective propeller. Moving the unison ring thus turns the lever arm or cam follower to vary the pitch of the propeller.

A second aspect of the present invention provides an engine arrangement having:

a first propeller assembly, a first pitch change mechanism which rotates with the first propeller assembly and which angularly displaces propellers of the first propeller assembly, and a first main hydraulic actuator which rotates with the first propeller assembly and which operates the first pitch change mechanism;

wherein the engine arrangement further has a back-up featherer according to the first aspect for angular displacement of the propellers of the first propeller assembly. The back-up featherer may have any one, or to the extent that they are compatible, any combination of the optional features of the first aspect.

The engine arrangement may have any one, or to the extent that they are compatible, any combination of the following optional features.

The engine arrangement typically further has a gear assembly that drives the first propeller assembly, the gear assembly being driven by a power drive shaft that joins to the gear assembly at a first side thereof. The rotating interface formed between the load application members and the engagement portion of the pitch change mechanism can then be on the first side of the gear assembly. The back-up hydraulic actuators and load application members can thus be radially outward of the power drive shaft.

The power drive shaft may have a longitudinally extending internal cavity, and the engine arrangement may further have:

a static conduit which extends along the internal cavity, the conduit penetrating the gear assembly such that a portion of the conduit projects from an opposing second side of the gear assembly, one or more first fluid supply lines for transferring hydraulic fluid between a primary hydraulic pressure power source located on a static structure of the engine arrangement and the first main hydraulic actuator, the first fluid supply lines being routed inside the static conduit, and a first main hydraulic rotating coupling mounted to the projecting portion of the static conduit, the first fluid supply lines fluidly communicating with the first main hydraulic actuator via the first main hydraulic rotating coupling.

Advantageously, as the static conduit extends along the internal cavity of the power drive shaft, the first main hydraulic rotating coupling mounted to the projecting portion of the static conduit can have a relatively small diameter and thus can provide a low PV value and low leakage rate.

The primary hydraulic pressure power source can also be the hydraulic pressure power source for the back-up featherer. Alternatively, however, the hydraulic pressure power source for the back-up featherer can be separate from the primary hydraulic pressure power source. For example, different pumps can supply hydraulic fluid for the first fluid supply lines and for the back-up fluid supply lines.

The arrangement can be used for engines having a single propeller assembly. However, preferably the engine arrangement is for a contra-rotating engine. For example, the engine arrangement may further have:

a second propeller assembly arranged to rotate in an opposite direction to the first propeller assembly, the gear assembly also driving the second propeller assembly, a second pitch change mechanism which rotates with the second propeller assembly and which angularly displaces propellers of the second propeller assembly, a second main hydraulic actuator which rotates with the second propeller assembly and which operates the second pitch change mechanism, one or more second fluid supply lines for transferring hydraulic fluid between the primary hydraulic pressure power source and the second main hydraulic actuator, the second fluid supply lines being routed inside the static conduit, and a second main hydraulic rotating coupling which is mounted to the projecting portion of the static conduit, the second fluid supply lines fluidly communicating with the second main hydraulic actuator via the second main hydraulic rotating coupling.

Typically, the gear assembly is an epicyclic gear assembly having e.g. a sun gear, and planetary gears driven by the sun gear and in turn driving a carrier. For example, the power drive shaft can drive the sun gear, and the carrier can drive the first propeller assembly. The epicyclic gear assembly may further have a ring gear driven by the planetary gears. In the context of a contra-rotating engine, the ring gear can drive the second propeller assembly.

Conveniently, the static conduit may penetrate an epicyclic gear assembly through the sun gear, which can help to avoid or reduce detrimental effects on gear assembly stiffness. Further, even if the gear assembly malfunctions, the ability of the fluid supply lines to transfer hydraulic fluid along the static conduit is unlikely to be compromised.

The first propeller assembly and the first main hydraulic actuator may be located at the first side of the gear assembly, the first fluid supply lines being re-routed through the gear assembly between the first main hydraulic rotating coupling and the first main hydraulic actuator. Such an arrangement may be adopted, for example, in relation to a contra-rotating engine. Thus when the gear assembly is an epicyclic gear assembly and the first propeller assembly is driven by a carrier of the gear assembly, the first fluid supply lines may be re-routed through the planetary gears and carrier of the gear assembly. In such an arrangement, the first fluid supply lines may penetrate one or more of the planetary gears and/or pass between at least some of the planetary gears.

In the context of an engine arrangement for a contra-rotating engine, the second propeller assembly and the second main hydraulic actuator are preferably located at the second side of the gear assembly.

Embodiments of the invention will now be described by way of example with reference to the accompanying drawings in which.

Figure 1:
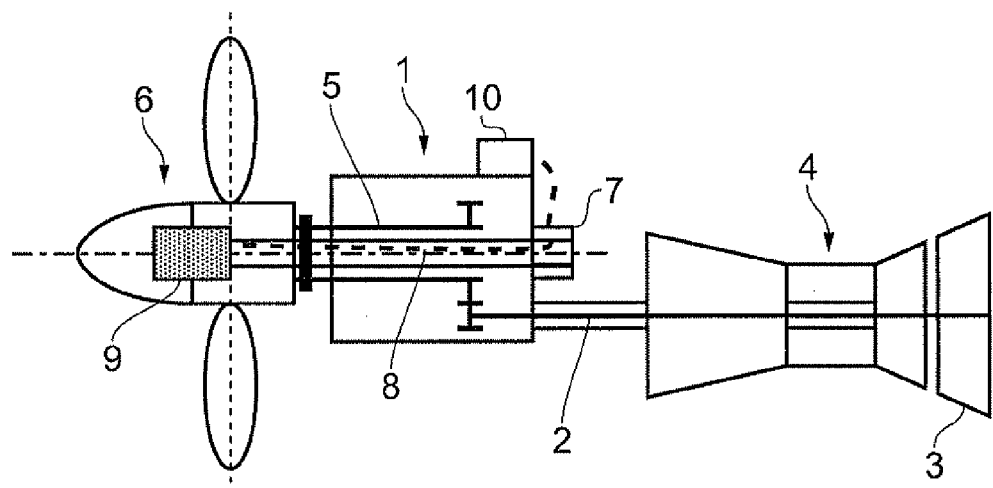
FIG. 1 shows a schematic longitudinal cross-section through a single propeller turboprop engine with a step-aside shaft configuration.
Figure 2:
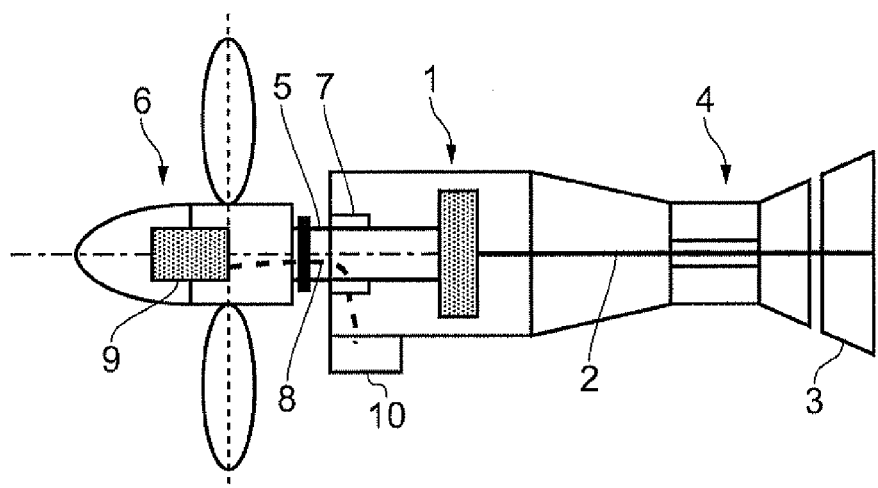
FIG. 2 shows a schematic longitudinal cross-section through a single propeller turboprop engine with an in-line shaft configuration.
Figure 3:
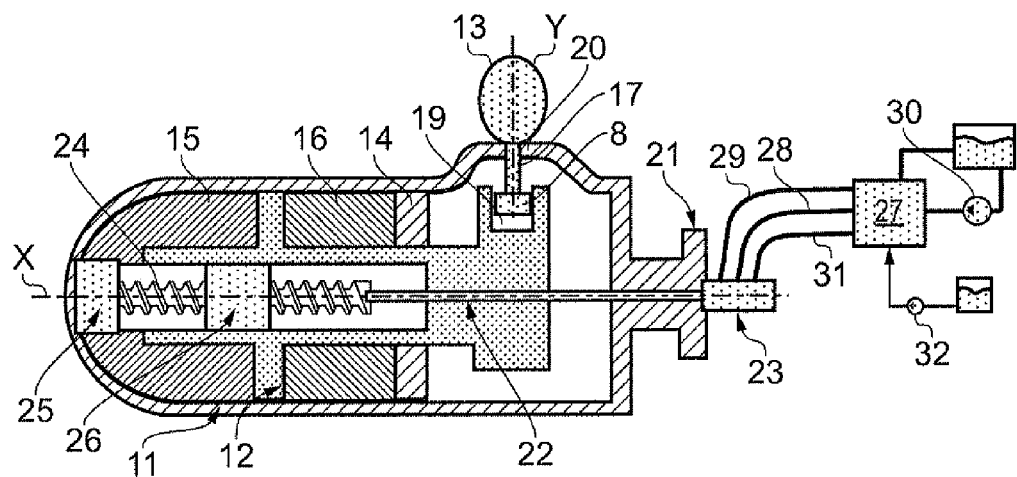
FIG. 3 shows schematically a longitudinal cross-section through a prior art screw pitch lock apparatus for varying the pitch of a row of propeller blades of a propeller assembly.
Figure 4:
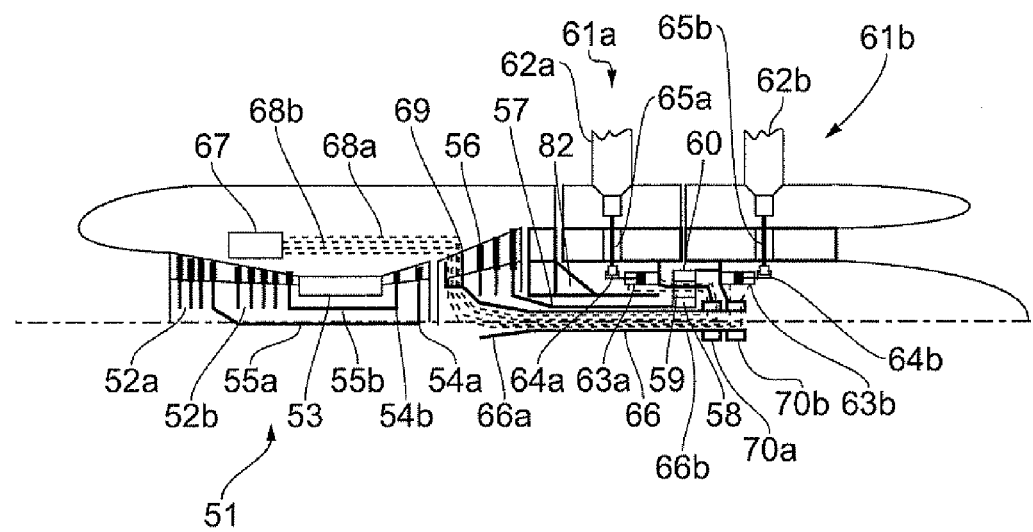
FIG. 4 shows a schematic longitudinal cross-section through a pusher style, contra-rotating propeller, turboprop engine with an in-line shaft configuration.

A schematic longitudinal cross-section through a pusher style, contra-rotating propeller, turboprop engine is shown in FIG. 4. The engine has a generator section 51 comprising in flow series low pressure 52a and high pressure 52b compressor subsections, a combustor subsection 53, and high pressure 54b and low pressure 54a turbine subsections. Generator drive shafts 55a, 55b connect the respective compressor and turbine subsections.

Downstream of the generator section is a free power turbine 56 which drives a rearwardly extending power drive shaft 57.

The distal end of the power drive shaft 57 drives a sun gear 58 of an epicyclic gear assembly which is coaxial with the power drive shaft. The sun gear drives planetary gears 59, which in turn drive a carrier (not shown) and a ring gear 60. The carrier and ring gear rotate in opposite directions. The carrier drives a first propeller assembly 61a on the upstream side of the gear assembly, while the ring gear drives a contra-rotating second propeller assembly 61b on the downstream side of the gear assembly. Each propeller assembly has a row of propeller blades 62a, 62b, with each blade being rotatable about its longitudinal axis to vary the blade pitch. The pitch variation for each propeller assembly is achieved by a respective main hydraulic actuator 63a, 63b which moves a corresponding unison ring 64a, 64b in the axial direction of the engine. The axial movement of the unison rings rotates the blades via a quill shaft and lever or cam follower arrangement 65a, 65b which extends from the base of each blade.

The power drive shaft 57 is hollow and a static conduit or central oil tube (COT) 66 extends along the internal cavity formed by the shaft. One end of the COT opens to a mouth 66a at the gap formed between the forward end of the power drive shaft and the rearward end of the low pressure generator drive shaft 55a. The other end of the COT penetrates through the centre of the sun gear 58 to form a projection 66b on the downstream side of the gear assembly. A hydraulic pressure power source 67 (comprising e.g. a hydraulic pump, valves and control unit) for actuating the actuators 63a, 63b is attached to an accessory gearbox (not shown) of the engine remote from the actuators 63a, 63b. The hydraulic fluid is typically filtered engine oil.

To transfer hydraulic fluid between the power source 67 and the actuators 63a, 63b, respective fluid supply lines 68a, 68b are routed from the source to the mouth 66a of the COT 66. The supply lines traverse the working gas annulus of the engine through a row of nozzle guide vanes 69 which are located between the generator section 51 and the free power turbine 56. This arrangement protects the supply lines from the high temperatures of the working gas. From the mouth of the COT, the supply lines are routed along the COT's internal cavity to arrive at the projection 66b on the downstream side of the gear assembly. A pair of axially spaced main hydraulic rotating couplings 70a, 70b are mounted to the projection, the upstream one associated with the hydraulic actuator 63a of the first propeller assembly 61a and the downstream one associated with the hydraulic actuator 63b of the second propeller assembly 61b. The internal sides of the couplings are formed by static fluid distributors while the external side of the upstream coupling 70a has a rotating sleeve that is driven by a drive bracket from the first propeller assembly 61a and the external side of the downstream coupling 70b has a rotating sleeve that is contra-driven by a drive bracket from the second propeller assembly 61b. Fluid is transmitted across upstream coupling 70a for those supply lines 68a which are routed to the main hydraulic actuator 63a of the first propeller assembly, while fluid is transmitted across downstream coupling 70b for the remaining supply lines 68b which are routed to the main hydraulic actuator 63b of the second propeller assembly.

The route taken by the supply lines 68b from the downstream coupling 70b to the main hydraulic actuator 63b of the second propeller assembly 61b can be relatively direct. In contrast, the route taken by the supply lines 68a from the upstream coupling 70a to the main hydraulic actuator 63a of the first propeller assembly 61a is more complicated as it passes through the gear assembly. Conveniently, the supply lines 68a are routed through the planetary gears 59 and carrier, which rotate with the first propeller assembly.

The engine arrangement overcomes problems with conventional propeller PCMs, particularly when applied to a pusher style contra-rotating open rotor with an in-line differential power gearbox. In particular, the arrangement of the COT 66 and the main hydraulic rotating couplings 70a, 70b mounted to the COT projection 66b allows small diameter couplings to be used and hence low PV values and low leakage rates can be achieved. Further the stiffness of the gear assembly is not substantially compromised by the COT extending through the sun gear 58. Also the potential for axial jamming of the transfer rods (used in EP A 1881176) and a consequent inability to feather the propeller blades to control drag and rotor speed is avoided.

The COT can also be used to route other power lines or control lines through the engine, these lines being e.g. hydraulic or electrical.

Figure 5:
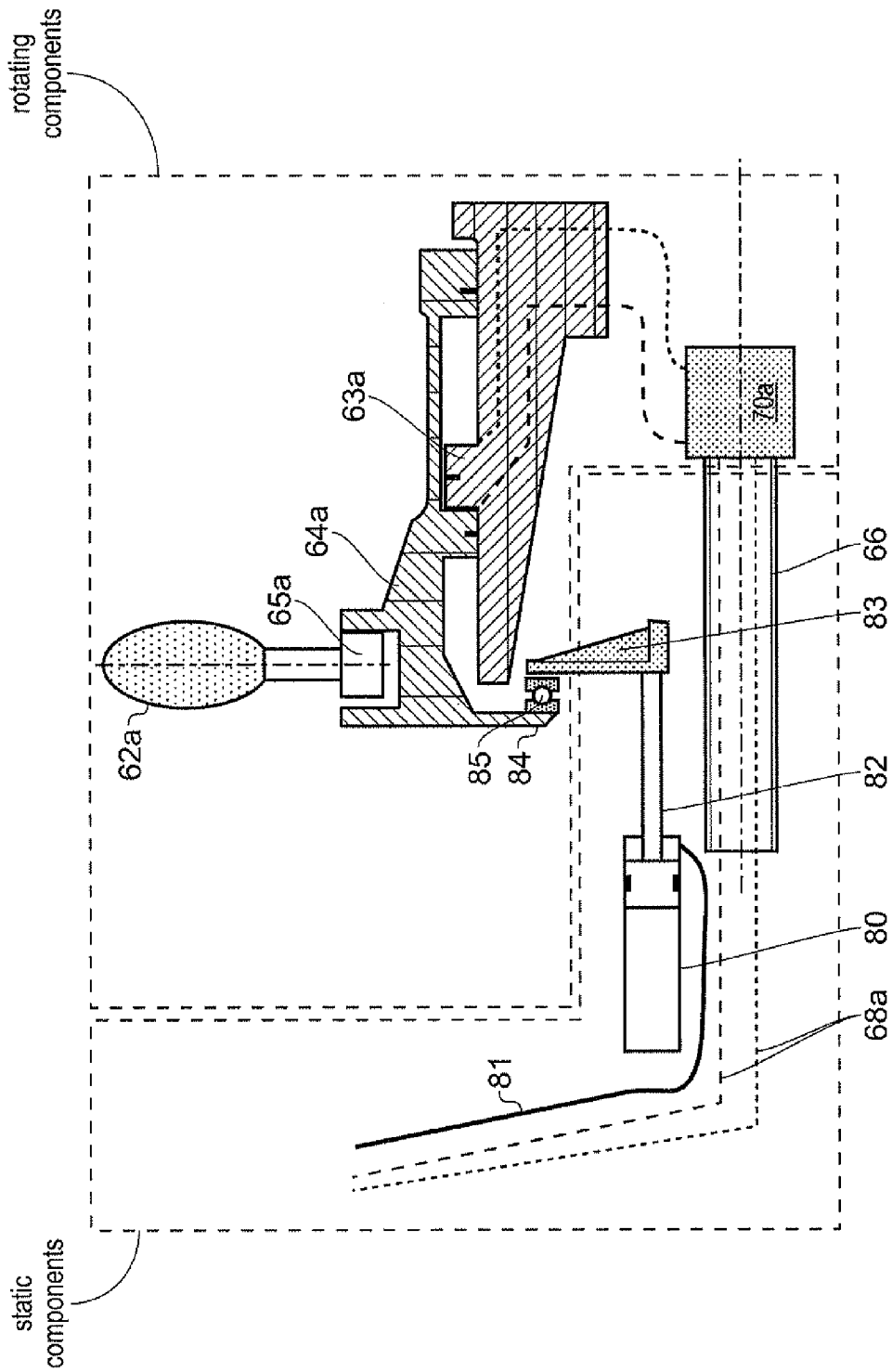
FIG. 5 shows schematically a back-up featherer used with the first propeller assembly of the engine of FIG. 4.

FIG. 5 shows schematically a back-up featherer used with the first propeller assembly 61a of the engine of FIG. 4. Features common to FIGS. 4 and 5 share the same reference numbers. The dashed outlines divide components between those that are statically mounted and those that rotate with the first propeller assembly The back-up featherer comprises a plurality of circumferentially spaced, back-up hydraulic actuators 80 which are mounted outside the power drive shaft 57 on a static part of the engine structure. A back-up fluid supply line 81 transfers hydraulic fluid between pitch control valves (not shown) and the back-up hydraulic actuators. The fluid supply lines 68a may be provided with hydraulic fluid from a primary pump (not shown), while hydraulic fluid for the back-up actuators may be supplied by a separate back-up feather pump (not shown).

The back-up fluid supply line 81 is routed along a pipe run (not shown) in a portion of the engine static structure between the power drive shaft 57 and the rotor for the first propeller assembly 61a, the static structure providing a mounting position for the bearings of the rotor.

Each hydraulic actuator 80 is connected by a respective ram 82 to a respective load application member 83 which projects radially outwards from the static part of the engine structure to face the aft side of a circular engagement flange 84 which projects radially inwards from the unison ring 64a of the first propeller assembly 61a.

Normally, when the back-up hydraulic actuators 80 are dormant, the load application members 83 are axially spaced from the engagement flange 84. However, in the event of failure of the primary PCM, which can allow movement of the blades 62a towards fine, the back-up hydraulic actuators are activated and, via the rams 82, move the load application members in the forward direction such that they take up the clearance from the engagement flange to bear against the aft side of the flange. A rotating bearing 85 located on the aft side of the flange allows the flange to continue rotating relative to the load application members even while a forward load is thus applied to the flange by the load application members. The forward load, which is transmitted to the unison ring 64a, causes the unison ring to move forwardly, which in turn produces movement of the blades 62a towards coarse.

After activation, the back-up hydraulic actuators 80 can be re-set by extending the rams 82, which moves the load application members 83 in the rearward direction and releases the forward load on the engagement flange 84.

The back-up featherer can provide:

A high integrity system which only slightly increases the overall PCM mass.

No requirement for drive signals to cross static-rotating interfaces.

A system which is independently testable and does not rely on the integrity of the supply lines of the primary PCM.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

All references mentioned above are incorporated by reference.

The invention claimed is:

1. A back-up featherer for an engine arrangement having a main hydraulic actuator which operates a pitch change mechanism to angularly displace propellers of a propeller assembly of the engine arrangement, the pitch change mechanism and main hydraulic actuator rotating with the propeller assembly, wherein the back-up featherer has:
   one or more back-up hydraulic actuators located on a static structure of the engine arrangement, and
   one or more load application members which are located on the static structure of the engine arrangement and which are movable by the back-up hydraulic actuators;
   wherein, when moved by the back-up hydraulic actuators, the load application members bear against an engagement portion of the pitch change mechanism across a rotating interface formed therebetween to apply a load to the pitch change mechanism which results in angular displacement of the propellers.

2. A back-up featherer according to claim 1, further having one or more back-up fluid supply lines for transferring hydraulic fluid between a hydraulic pressure power source located on the static structure of the engine arrangement and the back-up hydraulic actuators.

3. A back-up featherer according to claim 1, further having a rotating bearing at the rotating interface between the load application members and the engagement portion.

4. A back-up featherer according to claim 1, wherein the back-up hydraulic actuators have a dormant state in which the load application members are spaced from the engagement portion.

5. A back-up featherer according to claim 1, wherein the pitch change mechanism has a unison ring which is coaxial with the propeller assembly, the unison ring being movable by the main hydraulic actuator and by the back-up hydraulic actuators to operate drive systems for angular displacement of respective propellers.

6. An engine arrangement having:
   a first propeller assembly,
   a first pitch change mechanism which rotates with the first propeller assembly and which angularly displaces propellers of the first propeller assembly, and
   a first main hydraulic actuator which rotates with the first propeller assembly and which operates the first pitch change mechanism;
   wherein the engine arrangement further has a back-up featherer according to any one of the preceding claims for angular displacement of the propellers of the first propeller assembly.

7. An engine arrangement according to claim 6, further having a gear assembly that drives the first propeller assembly, the gear assembly being driven by a power drive shaft that joins to the gear assembly at a first side thereof;
   wherein the rotating interface formed between the load application members and the engagement portion of the pitch change mechanism is on the first side of the gear assembly.

8. An engine arrangement according to claim 7, wherein the power drive shaft has a longitudinally extending internal cavity, and the engine arrangement further has:
   a static conduit which extends along the internal cavity, the conduit penetrating the gear assembly such that a portion of the conduit projects from an opposing second side of the gear assembly,
   one or more first fluid supply lines for transferring hydraulic fluid between a primary hydraulic pressure power source located on a static structure of the engine arrangement and the first main hydraulic actuator, the first fluid supply lines being routed inside the static conduit, and
   a first main hydraulic rotating coupling mounted to the projecting portion of the static conduit, the first fluid supply lines fluidly communicating with the first main hydraulic actuator via the first main hydraulic rotating coupling.

9. An engine arrangement according to claim 8 which is for a contra-rotating engine, the arrangement further having:
   a second propeller assembly arranged to rotate in an opposite direction to the first propeller assembly, the gear assembly also driving the second propeller assembly,
   a second pitch change mechanism which rotates with the second propeller assembly and which angularly displaces propellers of the second propeller assembly,
   a second main hydraulic actuator which rotates with the second propeller assembly and which operates the second pitch change mechanism,
   one or more second fluid supply lines for transferring hydraulic fluid between the primary hydraulic pressure power source and the second main hydraulic actuator, the second fluid supply lines being routed inside the static conduit, and
   a second main hydraulic rotating coupling which is mounted to the projecting portion of the static conduit, the second fluid supply lines fluidly communicating with the second main hydraulic actuator via the second main hydraulic rotating coupling.

* * * * *